Figure 1:
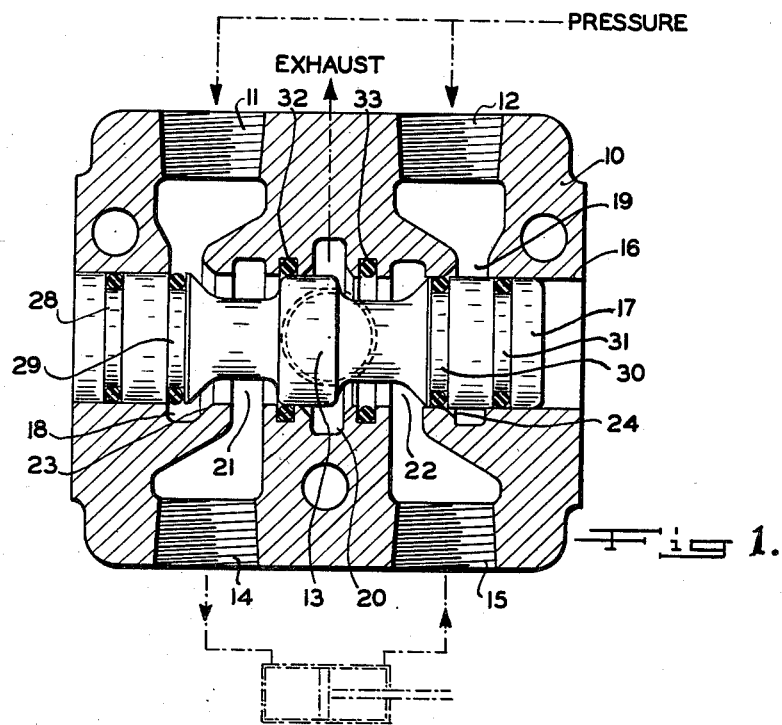

Feb. 15, 1955    M. M. SEELOFF    2,702,049
FLUID VALVE
Original Filed March 27, 1952

Inventor
MELVIN M. SEELOFF

By Francis J. Klempay
Attorney

United States Patent Office 2,702,049
Patented Feb. 15, 1955

2,702,049
FLUID VALVE

Melvin M. Seeloff, Warren, Ohio, assignor to The Taylor-Winfield Corporation, Warren, Ohio, a corporation of Ohio Continuation of application Serial No. 278,902, March 27, 1952, which is a continuation of application Serial No. 665,975, April 30, 1946. This application February 16, 1954, Serial No. 410,504

2 Claims. (Cl. 137—622)

This invention relates to fluid valves and more particularly to improvements in fluid valves of the kind utilizing resilient deformable rings of toroidal form as the active valving elements. Such a valve is disclosed and claimed in my U. S. Patent No. 2,524,142, and the present invention is an improvement of the valve structure disclosed in said patent. The present application is a continuation of my co-pending application Ser. No. 278,902, filed March 27, 1952, which is a continuation of application Ser. No. 665,975, filed April 30, 1946, both now abandoned.

By utilizing a resilient deformable toroidal shaped ring as the active valving element in a fluid valve in accordance with teachings of my issued patent as specified above very substantial advantages result in the production of valves and the valves produced are of superior operating characteristics as regards ease and dependability of operation, exceptionally long operating life, and utmost simplicity of maintenance. The basic principle of the generic invention is that the resilient deformable ring, commonly termed an O ring and usually made of synthetic neoprene rubber, is loosely received in an annular groove formed in a fixed or movable part of the valve for coaction with a round-shouldered annular land on the other cooperating part of the valve so that upon reciprocation of the movable part of the valve the O-ring climbs onto and off of the land with a rolling action. In accordance with this principle a sliding fit between the relatively movable rigid parts of the valve is wholly unnecessary and the valve may accordingly be made very simply and economically. Also, the rolling action of the O-ring in the absence of sliding friction reduces the power required to operate the valve to a minimum and makes the valve fast acting particularly since the moving part may be made of a light weight material such as aluminum, magnesium or plastic. As stated in my issued patent above specified, the axial length of the annular groove in which the O-ring valving element is seated in such as to not impede appreciably the rolling action of the ring as it moves over the rounded shoulder of the valving land into and out of closing position. Therefore the valving is accomplished almost solely by a rolling action of the ring and the extent of axial movement of the movable rigid part of the valve may be very small. Also, as the ring rolls onto the land in close to the valve the ring is compressed radially between the annular land and the bottom cylindrical surface of the groove in which the ring is retained so that an effective, tight and complete seal is thus very easily obtained while yet the pressures are easily relieved by the application of a slight axial force to the movable part of the valve due to the inherent tendency of the O-ring to roll back to its initial free condition unrestrained in the annular port of the valve.

Prior to the present invention the advantageous valve arrangement outlined above has been extremely limited in its application because to make the valve work properly in accordance with the original invention it is necessary to rather loosely mount the sealing ring in its retaining groove and this looseness as well as the inherent resilient deformable nature of the ring makes the ring prone to be blown out of its seat by the fluid pressures and velocities developed in the valve. It is accordingly the primary object of the present invention to obviate the difficulty of retaining the valving or sealing rings properly seated in their retaining means so that the basic valving arrangement, with all its advantages pointed out above, may be utilized in valves of any degree of complexity without restriction.

A further object of the present invention is the provision in a fluid valve of the kind utilizing loosely mounted resilient deformable O-rings as the active valving elements of an improved arrangement whereby the rings are subjected to a minimum of wear and tear and particularly assured against damage by shearing between the relatively moving parts of the valve assembly.

The above objects and advantages are accomplished by the principles of the present invention by so axially relating the annular ports and adjacent valving lands of the valving assembly that each valving ring of the assembly moves in the direction of fluid flow when closing and against the direction of fluid flow when opening. Thus, when any passage through the valve is open the valving ring for such passage is positioned in the annular inlet port of the passage with fluid pressure substantially uniform over its entire external surface whereby no appreciable forces are exerted on the ring tending to dislodge the ring from its seat. Upon closure of the passage and particularly as the valving ring approaches the rounded shoulder of the land the increase in velocity of the fluid over and about the ring tends only to draw the ring axially into the converging annular void and there is no tendency of the ring to blow out of its seat since the radial outward or inward expansion of the ring, as the case may be, is restricted by the ring contacting the land. The ring thus rapidly moves into position tending to close the passage and into tight engagement with the leading side edge of the annular groove in which the ring is seated so that upon further axial movement of this groove in a closing direction there remains some axial space in the groove behind the ring into which the ring can roll in the final closing of the passage. When the passage is closed the fluid pressure is exerted on one axial face only of the ring which tends to expand the ring radially into tight engagement with the land and with the bottom surface of the ring retaining groove to thereby provide a most effective seal. Upon opening this passage the ring, of course, tends to be held onto the land by the fluid pressure until the mechanical pressure exerted by the above said leading edge of the ring retaining groove is sufficient to overcome the same and the ring snaps away from the land whereby the fluid on opposite sides of the ring is rapidly equalized as explained above and the ring then rests free in the groove.

It should now be understood from the above that the guiding principle of the present invention is that the resilient deformable valving ring is loosely received in an annular recess or groove for cooperation with the valving land and that the ring and inlet port of the passage through the valve are so related that relative movement of the ring with respect to the land to close the passage is always in the direction of fluid flow and when the passage is open the ring is always in this port.

The above and other objects and advantages of the invention will become apparent upon consideration of the following detailed specification and the accompanying drawing wherein there is fully disclosed a preferred embodiment of the invention. While I have chosen a multiple-ported fluid valve to demonstrate the principles of the invention, it should be understood that the invention is equally applicable in various other devices and arrangements which will readily come to mind as the following description proceeds.

Figures 2, 3:
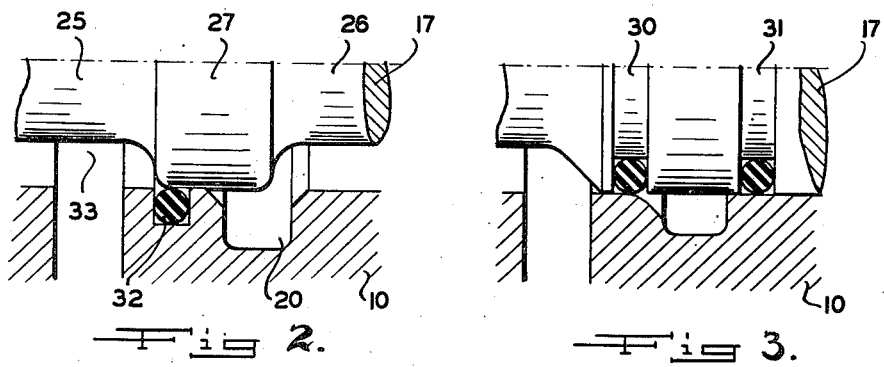

In the drawing:

Figure 1 is a longitudinal section of a multiple-ported fluid valve of the spool type constructed in accordance with the principles of the invention; and Figures 2 and 3 are enlargements of portions of Figure 1 to illustrate the principles of the invention.

In the drawing, reference numeral 10 designates the body of a valve which is provided with a pair of fluid inlet ports 11 and 12, fluid exhaust port 13, and a pair of fluid translation ports 14 and 15. In accordance with usual practice, a bore 16 extends axially through the body of member 10 and slidably mounted in this bore is a spool-like valve core 17 which, in practice, is arranged to be moved axially by suitable means, not shown. Communicating with the port 11 and positioned concentrically about the bore 16 is an annular recess 18. Similar recesses 19, 20, 21, and 22, are formed in the body member 10 in communication with the ports 12, 13, 14, and 15, respectively. The web separating the annular recesses 18 and 21 is beveled and rounded at its outer edge as shown at 23 while the outer edge of the web which separates recesses 19 and 22 is similarly beveled and rounded as shown at 24.

Spool 17 is machined from a round rod stock length and is reduced in diameter at spaced portions of its center part as shown at 25 and 26, allowing an integral shoulder 27 to remain and as shown more clearly in Figure 2 the annular side edges of the shoulder 27 are rounded or "eased" for a purpose to be later described. In each of the enlarged end portions of the spool 17 there is formed a pair of axially spaced annular grooves 28, 29, 30, and 31. Each of these grooves is arranged to receive a toroidal-shaped sealing ring of resilient deformable material as neoprene, for example, commonly termed O rings in the art. The dimensions of the grooves in relation to the dimensions of the rings are such that the rings are very slightly, if at all, compressed either in a radial direction or in an axial direction when the parts are at rest and no fluid pressure is applied to the valve.

A pair of annular grooves 32 and 33 are formed in the side wall of the bore 16 on opposite sides of the larger annular recess 20 to receive sealing rings of the character above specified, and, here too, the consideration of relative dimensioning is such that no compression is effected in the rings during the absence of fluid pressure. By referring to Figure 1, it will be observed that the outermost of the sealing rings which are located in the grooves 28 and 31 are always in the cylindrical bore 16 regardless of the position of the valve core 17 while the ring in groove 30 moves from a position in recess 19 to a position within the web intermediate the recesses 19 and 22 and the ring in groove 29 moves from a position in recess 18 to a sealing position intermediate recesses 18 and 21 and vice versa. During operation of the valve, the shoulder 27 reciprocates from a position within the ring housed in recess 32 to a position within the ring housed in groove 33.

In the position of the valve shown in Figure 1 the pressure inlet port 11 is connected with the port 14 while the port 15 is in communication with the port 13 and the port 12 is blocked off by the two sealing rings which are housed in the annular grooves 30 and 31 of the core 17. As both ends of the valve are identical the operation of but one will be described in detail in explanation of the principles of the invention. First, the leakage of any fluid pressure past the land intermediate the annular grooves 28 and 29 will cause fluid pressure to build up against the inner side of the ring in groove 28 thereby tending to flatten this ring against the outer side wall of the groove 28 and the effect of this is to expand the ring in a radial direction to effectively seal this end of the valve against emission of fluid pressure. When the core 17 is moved to the left as shown in Figure 1 there is equal pressure on all sides of the ring housed in groove 29 and there is no tendency for this ring to become displaced. The fluid pressure acting against the ring in groove 32 flattens this ring against the inner side wall of this groove thereby effectively sealing the annular space 21 from the annular space 20. If now the valve core 17 is moved to the right the shoulder 27 passes out of the ring in groove 32 but the ring is flattened and retained against the inner side wall of this groove as above described until pressure is equalized on all surfaces of the ring and the ring will stand freely in the groove. Upon the core 17 being moved to the right the ring in groove 29 moves into the cylindrical surface in the web intermediate the annular spaces 18 and 21 after traversing the bevel 23 and it should be observed that as this ring approaches such cylindrical surface and pressure builds up behind it the ring will be flattened and retained against the inner side wall of the groove 29.

It should now be apparent that the arrangement above described is most effective in preventing fluid pressure from blowing any of the sealing rings out of their sockets or grooves and in preventing shearing or other damage to the rings. These desirable results are accomplished primarily by so arranging the valve elements that at all times and in any position of the valve undue deformation of the flexible, deformable sealing rings by fluid pressure applied to the rings is restrained by at least one end wall of each ring retaining groove and by concentric cylindrical surfaces formed by the grooves and by contiguous surfaces of the opposite member of the valve. Thus, during movement of the valve core in a direction tending to unseat any of the sealing rings against the action of fluid pressure the normally deleterious action resulting from the friction encountered and by the radial expansion of the ring by the fluid pressure is offset by the confining of the ring in the annular socket formed by the concentric cylindrical restraining surfaces and by the adjacent side wall of the groove. This restraint is effective until the valve port is opened and the pressure equalized all about the ring.

It should be observed that in any valve constructed according to the present invention the sealing rings are subjected to an absolute minimum degree of wear since the rings do not have peripheral contact with the valve body (or core member) during the greater part of their paths of travel. The construction is such that the valving lands of the core or body have only slight relative movement with respect to the cooperating sealing rings and a substantial part of such relative movement may be taken up by rolling action of the rings. This, together with the fact that the valving ring entering lands are rounded or "eased" at their operative edges, reduces wearing of the rings and of the lands to a minimum. Also, this arrangement enables the valve parts to be constructed of readily machinable soft metals without the heretofore normal requirement of chrome or other hardening plating. I have found, for example, that by utilizing the principles of this invention a valve having a cast aluminum body member can be most economically and expeditiously produced and that such valve is of better than normal commercial longevity characteristics.

The above specifically described embodiment of the invention should be considered as illustrative only as obviously many changes may be made therein without departing from the spirit or scope of the invention. Reference should therefore be had to the appended claims in determining the scope of the invention.

I claim:

1. In a fluid valve comprising a body member having a bore therein with a multiplicity of axially spaced enlargements in said bore defining ports whereby at least two separate and independent fluid passages are provided through the valve, and a core member slidably received in said bore and having axially spaced portions of reduced diameter to provide communication axially through the annular lands separating the enlargements in said bore; the improvement which consists of annular grooves formed in certain of said lands, a toroidal-shaped fluid impervious ring of resilient and deformable material positioned in each of said annular grooves, said core member having annular lands contiguous to said portions of reduced diameter and having annular grooves in certain of said last mentioned lands, a toroidal-shaped fluid impervious ring of resilient and deformable material positioned in said last mentioned grooves, said rings and lands adapted to have alternate overlapping and axially displaced relation during operation of the valve, said annular grooves having end wall surfaces to limit axial movement of the ring retained therein in either axial direction, and said annular grooves being so positioned with respect to the ports containing fluid pressure that upon movement of the core to close off any of said ports containing fluid pressure the relative movement of the ring effecting such closure with respect to its cooperating valving land is in the direction of fluid flow and when opening is against the normal direction of fluid flow.

2. In a fluid valve of the type comprising a body member having a bore therein and having axially spaced inlet and outlet ports communicating with said bore, and a core member slidably received in said bore; the improvement which comprises a plurality of axially spaced cooperative pairs of annular valving areas on said bore and body members, said members having annularly recessed portions whereby upon predetermined axial movement of said core member with respect to said body member annular passage means are formed for the axial flow of fluid between ports, said pairs of valving areas each including a circumferential groove, a toroidal-shaped fluid impervious ring of resilient and deformable material positioned in each of said grooves, at least one of said grooves being in said core member and another of said grooves being in said body member, said grooves being of such axial dimension as to loosely receive said rings to permit limited rolling action thereof during opening and closing movements of said core member, said annularly recessed portions being positioned adjacent said valving areas and providing annular clearance substantially as great as the thickness of said rings opposite either of said rings and grooves when either of said rings overlies a recessed portion, said rings and ports being so oriented with respect to said annularly recessed portions that relative movement of either of said rings with respect to its valving land to cause axial flow of fluid over the valving land is in a direction opposite to the direction of said axial flow.

No references cited.